US011029050B2

(12) United States Patent
Sha et al.

(10) Patent No.: US 11,029,050 B2
(45) Date of Patent: Jun. 8, 2021

(54) INTERACTIVE COMMUNICATION BETWEEN A USER TERMINAL AND AN AIR CONDITIONER USING SOCIAL COMMUNICATION MEDIA APPLICATIONS

(71) Applicant: Carrier Corporation, Palm Beach Gardens, FL (US)

(72) Inventors: Danqing Sha, Shanghai (CN); Jinlei Ding, Shanhai (CN); Buyun Jing, Shanghai (CN); Yun Li, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/475,867

(22) PCT Filed: Jan. 15, 2018

(86) PCT No.: PCT/US2018/013725
§ 371 (c)(1),
(2) Date: Jul. 3, 2019

(87) PCT Pub. No.: WO2018/136363
PCT Pub. Date: Jul. 26, 2018

(65) Prior Publication Data
US 2019/0346164 A1    Nov. 14, 2019

(30) Foreign Application Priority Data

Jan. 19, 2017    (CN) .......................... 201710038374.6

(51) Int. Cl.
*F24F 11/30*    (2018.01)
*F24F 11/64*    (2018.01)
(Continued)

(52) U.S. Cl.
CPC .......... *F24F 11/30* (2018.01); *F24F 11/0008* (2013.01); *F24F 11/54* (2018.01);
(Continued)

(58) Field of Classification Search
CPC .. F24F 11/30; F24F 11/64; F24F 11/65; F24F 11/54; F24F 11/58; F24F 11/0008;
(Continued)

(56) References Cited

U.S. PATENT DOCUMENTS 8,868,218 B2    10/2014    Park et al.
9,300,707 B2    3/2016    Schmit
(Continued)

FOREIGN PATENT DOCUMENTS

CN    201429177 Y    3/2010
CN    102563814 A    7/2012
(Continued)

OTHER PUBLICATIONS

Chen, Lulu Yilun, "Tencent Works to Make WeChat Remote Control for Your Oven", Bloomberg L.P., Oct. 30, 2014, 1 page.
(Continued)

*Primary Examiner* — Ziaul Karim
(74) *Attorney, Agent, or Firm* — Cantor Colburn LLP

(57) ABSTRACT

An air-conditioning interactive terminal, a controller for an air-conditioning system, an air-conditioning system and an air-conditioning interactive system. The air-conditioning interactive terminal is configured with a social communication media module, wherein a user is registered as a first registered user in the social communication media module; the air-conditioning interactive terminal is configured such that the user realizes interactive communication between the first registered user and a second registered user corresponding to one or more air conditioners based on the social communication media module, wherein the second registered user is correspondingly registered by the air conditioners in the social communication media module. The
(Continued)

air-conditioning interactive terminal can be implemented based on an instant on-line chatting tool which has been applied on a large scale.

13 Claims, 3 Drawing Sheets

(51) Int. Cl.
| | |
|---|---|
| *F24F 11/65* | (2018.01) |
| *F24F 11/54* | (2018.01) |
| *F24F 11/58* | (2018.01) |
| *F24F 11/00* | (2018.01) |
| *G05B 15/02* | (2006.01) |
| *H04L 12/28* | (2006.01) |
| *F24F 110/10* | (2018.01) |
| *H04W 4/33* | (2018.01) |
| *H04L 29/08* | (2006.01) |

(52) U.S. Cl.
CPC .............. *F24F 11/58* (2018.01); *F24F 11/64* (2018.01); *F24F 11/65* (2018.01); *G05B 15/02* (2013.01); *H04L 12/2807* (2013.01); *H04L 12/2818* (2013.01); *H04L 12/2825* (2013.01); *F24F 2110/10* (2018.01); *H04L 67/10* (2013.01); *H04L 2012/285* (2013.01); *H04W 4/33* (2018.02)

(58) Field of Classification Search
CPC .. F24F 2110/10; G05B 15/02; H04L 12/2807; H04L 12/2818; H04L 12/2825; H04L 67/10; H04L 2012/285; H04L 51/32; H04L 12/2834; H04L 51/18; H04W 4/33
See application file for complete search history.

(56) References Cited

U.S. PATENT DOCUMENTS

| | | | |
|---|---|---|---|
| 2006/0186986 A1 | 8/2006 | Ma et al. | |
| 2009/0327436 A1 | 12/2009 | Chen et al. | |
| 2011/0046792 A1 | 2/2011 | Imes et al. | |
| 2013/0297078 A1 | 11/2013 | Kolavennu | |
| 2014/0306833 A1* | 10/2014 | Ricci | H04W 36/0005 |
| | | | 340/901 |
| 2014/0359018 A1* | 12/2014 | Sun | H04L 65/403 |
| | | | 709/204 |
| 2015/0188867 A1 | 7/2015 | Lee et al. | |
| 2015/0264147 A1 | 9/2015 | Lin et al. | |
| 2015/0264722 A1 | 9/2015 | Cheng et al. | |
| 2015/0331549 A1* | 11/2015 | Legris | G06F 3/04845 |
| | | | 715/798 |
| 2016/0104486 A1* | 4/2016 | Penilla | G10L 15/005 |
| | | | 704/232 |
| 2016/0226865 A1* | 8/2016 | Chen | H04W 12/0608 |
| 2016/0234140 A1* | 8/2016 | Sirpal | G06F 3/0485 |
| 2016/0277205 A1 | 9/2016 | Liu et al. | |
| 2016/0334943 A1 | 11/2016 | Jeon et al. | |

FOREIGN PATENT DOCUMENTS

| | | |
|---|---|---|
| CN | 104281106 A | 1/2015 |
| CN | 104570755 A | 4/2015 |
| EP | 1696620 A1 | 8/2006 |
| WO | 2010024778 A1 | 3/2010 |

OTHER PUBLICATIONS

International Search Report and Written Opinion for application PCT/US2018/013725, dated Mar. 19, 2018, 15 pages.
Samsung, "Samsung Smart Home Becomes Reality, Set to Transform Everyday Life" Samsung Newsroom, Apr. 2, 2014, 4 pages.
Werapun, Warodom et al., "Design of Home Automation Framework With Social Network Integration", Journal of Networking Technology vol. 5 No. 4 Dec. 2014, 6 pages.

* cited by examiner

INTERACTIVE COMMUNICATION BETWEEN A USER TERMINAL AND AN AIR CONDITIONER USING SOCIAL COMMUNICATION MEDIA APPLICATIONS

TECHNICAL FIELD

The present invention belongs to the technical field of air conditioners, and relates to an air-conditioning interactive terminal capable of instant interactive communication with an air conditioner or a group of air conditioners through social communication media software, a controller for an air-conditioning system, an air-conditioning system and an air-conditioning interactive system comprising the same.

BACKGROUND ART

During the application of air conditioners, various users need to interact with the air conditioners to perform operations such as temperature adjustment and air conditioner switching-on/off. In traditional solutions, a user usually realizes such functions through a remote control or a traditional thermolator. For example, the user can realize the operations of mode switching, temperature adjustment and air conditioner switching-on/off through different buttons on the remote control or the thermolator. Such solution can be used only when a remote control device is beside the user, and the remote control device has a very limited control distance and monotonous function and is inconvenient to use. For example, the user cannot reserve the air conditioner in advance on the spur of the moment, and the demand of the user to know operation state information of the air conditioner cannot be satisfied either, and so on. For another example, taking an air conditioner management/maintenance personnel for maintaining or monitoring the air conditioner as an example, the management/maintenance personnel can only interact with the air conditioner in an air conditioner remote monitoring system for the air conditioner. The interaction is difficult and has a high requirement for the degree of specialization.

With the appearance of new technologies, in recent years, smart thermolators have already been widely used to control the air conditioner, such as Nest, Ecobee, Honeywell, etc. The user can make any settings to the air conditioner through a smart thermolator. Furthermore, the user can control the air conditioner through a dedicated APP on a smart phone corresponding to the smart thermolator. Since more and more people across the world are using smart phones, remotely controlling various devices through mobile apparatuses is a global development trend.

The other trend is that: with the rapid development of mobile communication and artificial intelligence, humans can also communicate with devices by means of "speaking" or "texts". This would make the communication between humans and smart devices easier, more rapid and effective.

SUMMARY OF INVENTION

One of the objectives of the present invention is to realize more effective, convenient and rapid interactive communication between a user and an air conditioner.

A further objective of the present invention is to realize remote instant interactive communication between a user and an air conditioner.

In order to realize the above-mentioned objectives or other objectives, the following technical solutions are provided in the present invention.

According to one aspect of the present invention, provided is an air-conditioning interactive terminal configured with a social communication media module, wherein a user is registered as a first registered user in the social communication media module; the air-conditioning interactive terminal is configured such that the user realizes interactive communication between the first registered user and a second registered user corresponding to one or more air conditioners based on the social communication media module, wherein the second registered user is correspondingly registered by the air conditioners in the social communication media module.

According to a still aspect of the present invention, also provided is a controller for an air-conditioning system, the controller being coupled to a bus of the air-conditioning system comprising an air-conditioning end and an air-conditioning host and configured with a social communication media module, wherein the controller is registered as a second registered user in the social communication media module, and the second registered user can realize interactive communication with a first registered user of the social communication media module registered by a user through an interactive terminal.

According to a still aspect of the present invention, also provided is an air-conditioning interactive system comprising: an air-conditioning interactive terminal as stated above; an air-conditioning system comprising an air-conditioning end and an air-conditioning host; and a controller for an air-conditioning system as stated above, wherein, based on the social communication media module, a first registered user corresponding to the user on the air-conditioning interactive terminal interactively communicates with a second registered user corresponding to the air conditioner on the controller for an air-conditioning system.

According to a further aspect of the present invention, also provided is an air-conditioning system comprising an air-conditioning end, an air-conditioning host and a server coupled to a bus of the air-conditioning system, the server being configured with a social communication media module, wherein the air-conditioning end and/or air-conditioning host corresponding to the server is registered as a second registered user in the social communication media module, and the second registered user can realize interactive communication with a first registered user of the social communication media module registered by a user through an interactive terminal.

According to a still another aspect of the present invention, also provided is an air-conditioning interactive system comprising: an air-conditioning interactive terminal as stated above; and an air-conditioning system as stated above, wherein, based on the social communication media module, a first registered user corresponding to the user on the air-conditioning interactive terminal interactively communicates with a second registered user corresponding to the air conditioner on a server for the air-conditioning system.

The technical effects of the present invention are that: the air-conditioning interactive terminal, the controller for an air-conditioning system, an air-conditioning system and an air-conditioning interactive system of the embodiments of the present invention can be implemented based on an instant on-line chatting tool which has been applied on a large scale. Accordingly, not only the work of specifically developing a corresponding APP or software is omitted and the development cost is low, but also this mode of interactive communication with an air conditioner is more easily acceptable for a user. Moreover, the interactive communication process can be implemented by way of instant on-line chatting, and the interactive communication process with the air conditioner is very expedient, simple, effective, convenient and rapid, and can be implemented remotely. Therefore, the user experience is greatly improved.

BRIEF DESCRIPTION OF THE DRAWINGS

From the detailed description below in conjunction with the accompanying drawings, the above-mentioned and other objectives and advantages of the present invention would be more complete and clear, where the same or similar elements are denoted with the same label.

DETAILED DESCRIPTION

Figure 1:
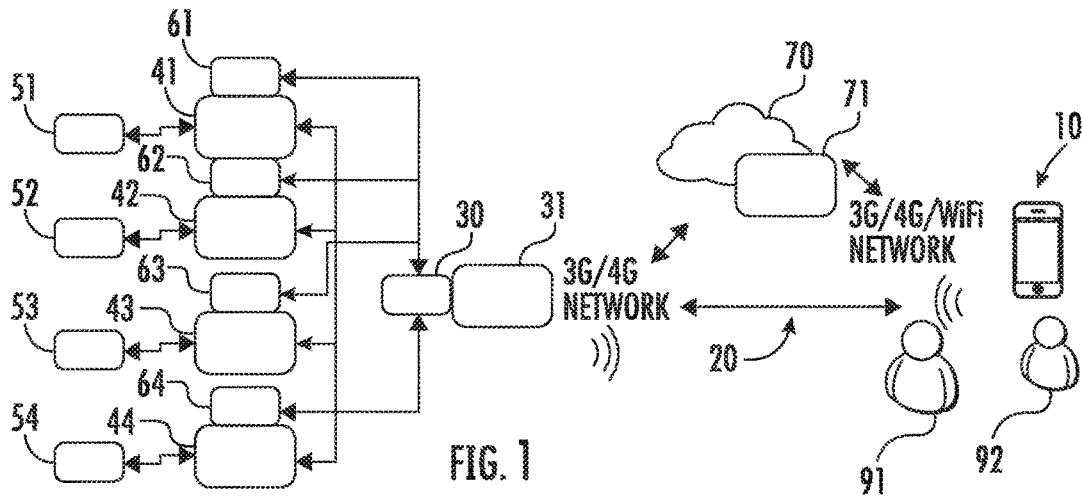
FIG. 1 is a schematic diagram of the module structure of an air-conditioning interactive system according to one embodiment of the present invention.

Introduced below are some of multiple possible embodiments of the present invention, which are intended for providing fundamental understanding of the present invention, and are not intended for confirming key or decisive elements of the present invention or defining the scope of protection of the present invention. It would be easily understood that, according to the technical solutions of the invention, a person of ordinary skill in the art can propose other alternative implementations without altering the essential spirit of the invention. Therefore, the following particular embodiments and accompanied drawings are merely exemplary explanation of the technical solutions of the invention, and should in no way be considered as the entirety of the invention or be considered as constrictions or limitations to the technical solutions of the invention.

In the following description, for the clarity and conciseness of description, not all components or modules shown in the drawings are described in detail. A plurality of components or modules by which a person of ordinary skill in the art can completely realize the present invention are shown in the accompanied drawings; and for a person skilled in the art, the operations of many components or modules are familiar and obvious.

FIG. 1 shows a schematic diagram of the module structure of an air-conditioning interactive system according to one embodiment of the present invention. More particularly, it relates to the scenario of a domestic central air-conditioner, wherein each air conditioner end is respectively provided with a corresponding sub-controller 41, 42, 43 or 44. As shown in FIG. 1, the air-conditioning interactive system of the embodiments of the present invention uses an air-conditioning interactive terminal 10 of one embodiment. The air-conditioning interactive terminal 10 can be various smart mobile terminals used by a user, for example, a Smart phone shown in FIG. 1. The air-conditioning interactive terminal 10 is carried by a user with himself/herself, and is very convenient for the user to use. The air-conditioning interactive terminal 10 is installed with various social communication media applications or social communication media software, for example, WeChat, WhatsApp, Line, Weibo, Twitter or Facebook, etc. Moreover, although not shown in the drawings, as a medium for storing, temporarily storing, transferring or delivering information, the air-conditioning interactive terminal 10 can also be provided with a corresponding server.

Correspondingly to the air-conditioning system side, it is configured with a controller/server 30, and the server 30 can be a computer module and can also be shared with the server of the air-conditioning control system. The server 30 is also installed with a corresponding social communication media application or social communication media software, for example, WeChat, WhatsApp, Line, Weibo, Twitter or Facebook, etc. Of course, during practical application, a social communication media application or social communication media software can also be installed for each sub-controller 41, 42, 43 and 44, and in this embodiment, in consideration of the convenience of application, it is chosen to directly install a corresponding application in the server 30.

The social communication media applications installed in the air-conditioning interactive terminal 10 and the server 30 are of the same type, for example, both being WeChat. The social communication media application is generally used by the majority of users and is used in a wide variety of aspects; therefore, the way of communicating and interacting with the air conditioner based on the social communication media application can be easily accepted. Moreover, the social communication media application has strong functions. For example, it can realize the interactive transmission of information in many forms such as texts, voices, etc. between different users, and for example it also has the function of issuing We-Media, etc.; therefore, the social communication media application is very beneficial for widening the form of the content interactively communicated between the user and the air conditioner.

It should be noted that the specific type of the social communication media application or software is not an embodiment of the present invention, and for example can also be various different types of social communication media applications or software appeared after the date of application of the present application. Exemplary description is made by taking WeChat as the social communication media application as an example, wherein the server 30 and the air-conditioning interactive terminal 10 can download a WeChat client program and install the same, thus there is no need to specially develop an APP or software applicable for the air-conditioning interactive terminal for the interaction with the air conditioner. It should be understood that other social communication media applications can also realize the objectives and functions of the present application based on similar principles.

A user is registered as a first registered user in WeChat of the air-conditioning interactive terminal 10; and different users are registered as different first registered users. Since a user generally has already been registered as the first registered user (i.e., a user ID) when using WeChat for social chatting, there is no need for specially registering a corresponding user ID for the interactive communication with the air conditioner.

One or more air conditioners are registered as second registered users at the server 30 side; and through the server 30, the second registered users can actively send information to the corresponding first registered user. In the embodiment, a second registered user (i.e., a user ID) can be registered by taking a plurality of air conditioners as a group; taking the application scenario of the set of central air-conditioner as an example, it comprises an air conditioner group composed of four air conditioners, and registers a registered user ID, i.e., a second registered user, in WeChat through the server 30. It should be noted that it is also possible to register one second registered user for each air conditioner; and if there are a plurality of air conditioner groups in the application scenario, it is also possible to register a corresponding user ID for each air conditioner group.

Taking the air-conditioning interactive terminal 10 being a smart phone installed with WeChat as an example, the server 30 and the air-conditioning interactive terminal 10 are in communicative connection through a network; the network can particularly be but is not limited to a 3G/4G/Wifi network; correspondingly, a corresponding 3G/4G/Wifi transceiver 31 is provided at the server 30 side, thus WeChat information sent out by the user from the air-conditioning interactive terminal 10 can be instantly received and transferred to the server 30 by the 3G/4G/Wifi transceiver 31. It should be noted that the transmitted content can be interacted with in the network through a server of a social communication media application operator (e.g., WeChat operator); and the network is also not limited to a 3G/4G/Wifi network, and the network can also be a 5G network, etc. In the illustrative embodiments of the present invention, exemplary description is made based on the 3G/4G/Wifi network.

Optionally, a Cloud 70 can also be provided in the network. The server 30 can be in communicative connection with the cloud 70 and transmit data through the network, and the air-conditioning interactive terminal 10 can also be in communicative connection with the cloud 70 and transmit data through the network; the cloud 70 is provided with one or more cloud servers 71, and the content interactively communicated between the first registered user and the second registered user can all be stored in the cloud server 71 in the form of cloud data, and the mutual interactive communication is conducted based on the cloud. As such, for an air-conditioning system seeking for information security, it is relatively secure. Particularly, the cloud server 71 can be provided with a corresponding cloud database to store the content interactively communicated between the first registered user and the second registered user. As a particular implementation applying the cloud server 71, the first registered user can upload, to the cloud server 71, a personalized temperature/humidity comfort interval set thereby; and/or the cloud server 71 learns by itself by means of a set temperature/humidity value input by the first registered user historically, to acquire the personalized temperature/humidity comfort interval of the user; and the second registered user is controlled by the cloud server, so as to set the position where the first registered user is located into the personalized temperature/humidity comfort interval of the user. In this way, a user-satisfied air conditioner operation state can be conveniently and rapidly acquired, improving user comfort.

Continuing to refer to FIG. 1, in one embodiment, the server 30 is coupled to an air conditioner bus, and is thus coupled to the sub-controller 41, 42, 43 and 44 corresponding to each air conditioner; taking the air conditioner group stated above as an example, they are respectively corresponding to the sub-controller 41 of a first air conditioner, a sub-controller 42 of a second air conditioner, a sub-controller 43 of a third air conditioner and a sub-controller 44 of a fourth air conditioner, and these controllers are all provided on the air conditioner bus. Therefore, the server 30 can interactively communicate with the sub-controller of each air conditioner.

Optionally, in order to clarify how each function is realized, module settings in the server will be further deconstructed herein. In the embodiment, the server is provided with two transcoding modules, i.e., a first transcoding module and a second transcoding module, wherein the first transcoding module can receive a user message or a user instruction delivered upwards from the 3G/4G/Wifi transceiver 31; at this moment, the user message or the user instruction is for example in the form of WeChat language, and the first transcoding module converts the same into a message or instruction satisfying the data format of the air conditioner bus and delivers the same upwards to the air conditioner bus, thus being able to interactively communicate with the sub-controller of each air conditioner. The second transcoding module can receive the message or information transmitted from the air conditioner bus, and convert the same into a message or information satisfying the format of the social communication media application, for example it can convert the same into WeChat language, and deliver the same to the 3G/4G/Wifi transceiver 31 downwards, so as to further transmit the same to the user of the air-conditioning interactive terminal 10.

In this way, interactive communication between the user and the air conditioner or air conditioner group can be implemented, and can be implemented by way of on-line chatting.

Before the interactive communication between the user and the air conditioner or air conditioner group, the first registered user corresponding to the user of the air-conditioning interactive terminal 10 need to firstly request to add the second registered user corresponding to the corresponding air conditioner or air conditioner group as an object of the interactive communication, for example adding the same as a friend, and pass the verification of the personnel managing the second registered user. The above-mentioned process of adding a friend can take place in WeChat, and the personnel managing the second registered user can determine whether to pass the verification according to a building management rule, first registered user information, etc., and the particular conditions are not limiting.

Also as shown in FIG. 1, in the embodiment, two types of users are shown, i.e., a user 91 and a management/maintenance personnel 92. The user 91 should learn the operation state of the air-conditioning end or send out a simple control instruction thereto, for example adjusting the temperature/humidity or changing an operation mode; and the management/maintenance personnel 92 has more demands than the user 91, for example, demanding for more information relevant to the air conditioner, for example, querying a maintenance state or controlling the air-conditioning host, etc. It should be appreciated that the user is not limited to the two types in the embodiments of the present invention. For example, there may also be a user of a building management personnel or the like.

In the embodiment, a first registered user corresponding to a user similar to the user 91 is defined as an ordinary friend type for the second registered user corresponding to the air conditioner or air conditioner group, and a first registered user corresponding to a user similar to the management/maintenance personnel 92 is defined as a special friend type for the second registered user corresponding to the air conditioner or air conditioner group. Different friend types determine the breadth and depth of the content interactively communicable thereby with the air conditioner or air conditioner group; that is, the content interactively communicable between the first registered user and the second registered user is defined by the friend type between the first registered user and the second registered user. When the first registered user is of an ordinary friend type with for second registered user, the content interactively communicable between the first registered user and the second registered user (namely, between the user 91 and the air conditioner or air conditioner group) comprises but is not limited to: operation state information of a queried air conditioner and first query result information returned correspondingly, and/ or an air-conditioning end control instruction and air-conditioning end control result information returned correspondingly. When the first registered user is of a special friend type for the second registered user, the content interactively communicable between the first registered user and the second registered user (namely, between the management/maintenance personnel 92 and the air conditioner or air conditioner group) comprises but is not limited to: a maintenance schedule for a queried air conditioner and second query result information returned correspondingly; an air-conditioning host control instruction and air-conditioning host control result information returned correspondingly; and an air-conditioning end control instruction and air-conditioning end control result information returned correspondingly; and maintenance state information of the air-conditioner.

In one embodiment, the user 91 or the management/ maintenance personnel 92 can query the air conditioner operation state information of the corresponding air conditioner or air conditioner group before remotely controlling the air conditioner, for example, querying the current operation temperature/operation humidity, set temperature/set humidity and/or operation mode of the air conditioner, etc.; and it should be noted that the air conditioner operation state information queried by any user 91 or management/maintenance personnel 92 is not limited to the above-mentioned embodiment; and any air conditioner operation state beneficial for improving user experience but not affecting the normal operation of the air conditioner can be actively queried by the user 91 or the management/maintenance personnel 92, and thus be learned by the user. For example, as another example, the user 91 or the management/maintenance personnel 92 can also query device nameplate information of the air conditioner, so as to understand a possible operation state thereof.

The second registered user corresponding to the air conditioner or air conditioner group can feed back corresponding query result information, i.e., first query result information, according to the active query of the user 91 or the management/maintenance personnel 92. The first query result information comprises but is not limited to: the device nameplate information of the air conditioner and/or a current operation temperature/operation humidity, set temperature/ set humidity and/or operation mode of the air conditioner and/or an operation state of an air conditioner component and/or energy consumption of the air conditioner, etc. As such, the user 91 can determine, according to these pieces of result information, whether to execute a control instruction or perform other instructions on the air conditioner, for example, modifying an operation mode, starting or stopping the air conditioner, etc.

The user 91 or management/maintenance personnel 92 can include an air-conditioning end control instruction in the air conditioner control instruction sent out by the air-conditioning interactive terminal 10. These air-conditioning end control instructions are delivered upwards to the air conditioner bus successively through the 3G/4G/Wifi network, the 3G/4G/Wifi transceiver 31 and the server 30, thus the corresponding air-conditioning end control instruction is sent to the corresponding air conditioner sub-controller 41, 42, 43 and 44, so as to realize the control over each air conditioning end. After the control is completed or the control instructions are sent out, the air conditioner sub-controllers 41, 42, 43 and 44 further send air conditioner scheduling result information to the server 30; and after format conversion at the second transcoding module of the server 30, the air conditioner scheduling result information is fed back to the first registered user, i.e., the user 91 or the management/maintenance personnel 92, in the form of WeChat language. In particular, the corresponding air conditioner control result information can comprise but is not limited to: whether the control instruction is executed for an estimated control instruction duration.

In the embodiment, the management/maintenance personnel 92 can interactively communicate more information contents with the air conditioner, as stated above, and can even send an air-conditioning host control instruction to the air-conditioning system, for example, sending an air-conditioning host control instruction to enable the air-conditioning host to enter a sleep standby overhaul mode at a pre-determined time. The second registered user corresponding to the air conditioner can even actively send air conditioner maintenance information to the first registered user of the management/maintenance personnel, for example, actively sending air conditioner maintenance state information such as "surplus of lubricating oil" and "last overhaul time of electromagnetic valve" to the management/ maintenance personnel, so as to actively alarm or show to the air conditioner management/maintenance personnel, facilitating the management/maintenance personnel in conducting maintenance work quickly, and ensuring the safe operation of the air conditioner. It should be noted that the air conditioner maintenance state information can refer to state information of a component or module of the air conditioner that needs to be maintained, which can be selected and determined according to the component or module that needs to be maintained.

Further, the management/maintenance personnel 92 queries an air conditioner maintenance schedule; the query is delivered upwards to the air conditioner bus by the server 30; and second query result information is returned after the air conditioner maintenance schedule is queried in the air-conditioning system; and the second query result information is returned to the first registered user corresponding to the management/maintenance personnel 92 after being transcoded at the server 30. Thus, the maintenance work plan or maintenance work arrangement can be conveniently learned.

The above-mentioned interactive communication between the first registered user of the air-conditioning interactive terminal 10 and the second registered user of the server 30 end is shown in FIG. 1 as label 20, wherein the interactive communication comprises information sent from the first registered user of the air-conditioning interactive terminal 10 and information sent or returned from the second registered user (the server 30 end) corresponding to the air conditioner or air conditioner group. Based on WeChat, the instant chat between the first registered user of the air-conditioning interactive terminal 10 and the second registered user corresponding to the air conditioner or air conditioner group is realized, conveniently and rapidly completing operations such as switching the operation mode of the air-conditioning end, and the instant chat can be implemented through, for example, a 3G/4G/Wifi network; and the interactive communication between the user and the air conditioner is not limited to a local area position but can be performed remotely and instantly. Therefore, the user experience is greatly improved, and such interactive communication is highly acceptable for users.

Also as shown in FIG. 1, in the embodiment, the server 30 can also be coupled with temperature/humidity sensors 51, 52, 53 and 54 corresponding to each of the four air conditioners; the temperature/humidity sensors 51, 52, 53 and 54 for example can respectively be mounted in a temperature adjustment region corresponding to four air-conditioning ends, and temperature/humidity information obtained thereby can be delivered upwards to the server 30; and according to a command request of the first registered user of the air-conditioning interactive terminal 10, the server 30 can send the temperature/humidity information of a corresponding moment to the first registered user, wherein the temperature/humidity information can reflect the actual control conditions in the air-conditioning temperature adjustment region, and so on, which can be used as a reference for the first registered user.

Furthermore, the content of the interactive communication 20 between the first registered user of the air-conditioning interactive terminal 10 and the second registered user at the server 30 end comprises but is not limited to text information (for example, text information represented by the WeChat language), and even can also comprise multimedia information such as voice and pictures; taking WeChat as an example, the first registered user or the second registered user can send voice information, or voice chat can be implemented between both. To this end, a voice assistant module (not shown in the drawings) can be provided on the server 30, for example Siri voice assistant or Cotena voice assistant. By means of the voice assistance module, the second registered user can not only identify voice information or a voice instruction sent from the first registered user, but also can convert information fed back by the air conditioner controller into voice information and send the same to the first registered user.

Figure 2:
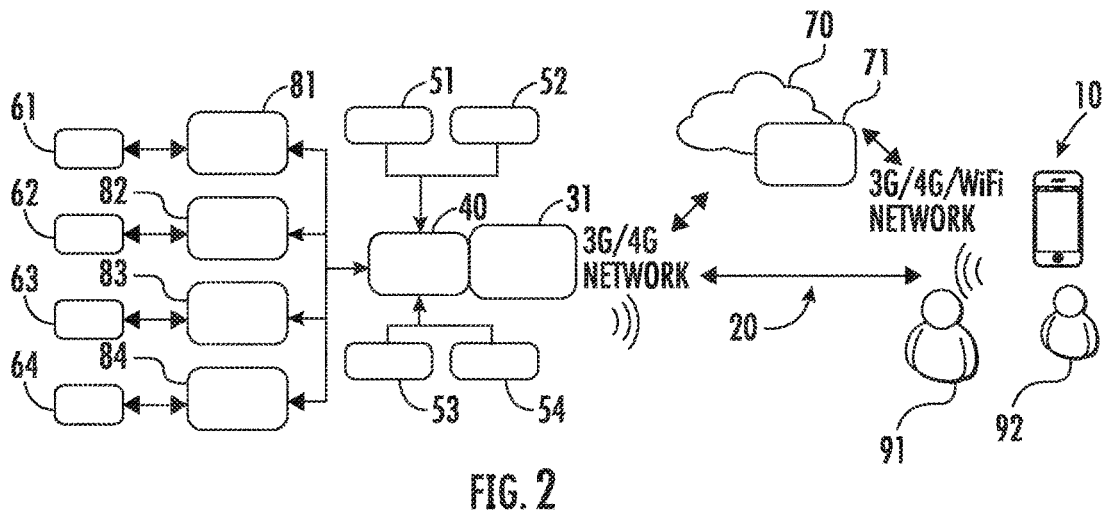
FIG. 2 is a schematic diagram of the module structure of an air-conditioning interactive system according to a further embodiment of the present invention.

FIG. 2 shows a schematic diagram of the module structure of an air-conditioning interactive system according to a further embodiment of the present invention. More particularly, it relates to the scenario of a domestic central air-conditioner, where each air conditioner end is no longer provided with a controller alone; instead, a main controller 40 controls and schedules a plurality of air conditioners 81, 82, 83 and 84 overall. At this moment, the server can be left out, and instead the 3G/4G/Wifi transceiver 31 is directly arranged on the AC controller 40, and a second registered user is directly registered for the AC controller 40. The other members and settings of the air-conditioning interactive system are similar to the embodiment shown in FIG. 1; and the way of arranging the 3G/4G/Wifi transceiver 31 on the controller 40 and the way of interactive communication thereof with the other terminals or servers are also similar to the embodiment stated above, which therefore will not be described herein any more.

Figure 3:
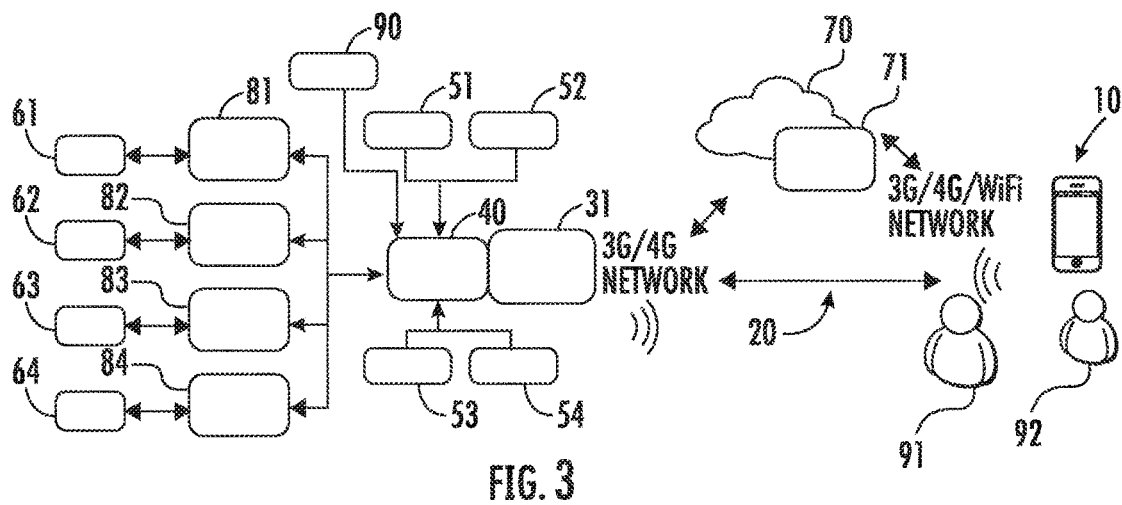
FIG. 3 is a schematic diagram of the module structure of an air-conditioning interactive system according to another embodiment of the present invention.

FIG. 3 shows a schematic diagram of the module structure of an air-conditioning interactive system according to another embodiment of the present invention. More particularly, it relates to the scenario of a commercial central air-conditioner; therefore, it carries the main controller 40 and the Building Manage System (BMS) 90 at the same time. The main controller 40 can be directly or indirectly coupled to the BMS 90, for example, as shown in FIG. 3, coupled to the BMS 90 through the air conditioner bus, so that the main controller 40 can further interactively communicate with the BMS 90; for example, the content which is controlled, by the main controller 40 for the air conditioner, to be fed back can be completely or partially transmitted to the BMS 90 simultaneously; and the information or instruction received by the main controller 40 from the first registered user can be sent to the BMS 90 at the same time after format conversion. That is to say, the content interactively communicated between the first registered user and the second registered user can be completely or partially sent to the BMS 90; and the BMS 90 is further configured to adjust and control, according to the content interactively communicated between the first registered user and the second registered user, the state of the other devices or systems (other than the air conditioner) controlled thereby. For example, according to the content interactively communicated between the first registered user and the second registered user, the BMS 90 can learn the control instruction of the user and the current operation state of the air conditioner; in this way, the BMS 90 can determine that there is presently a user who will stay for a period of time or temporarily live in a certain room; and the BMS 90 controls a light control system, a toilet hot water system, etc., or the BMS 90 can also control an entrance control system and perform identification when a user arrives, and automatically unlock the entrance control system. The other members and settings of the air-conditioning interactive system are similar to the embodiment shown in FIG. 1, which therefore will not be described herein any more.

It can be seen from the previously stated embodiment that, in fact, the 3G/4G/Wifi transceiver can be selectively carried on the main controller or the server according to a practical application situation, and even can also be carried on each sub-controller alone. Correspondingly, a social media user account can also be selectively registered for a main controller, a sub-server or a server according to a practical application situation.

Additionally, it should also be noted that the content and way of the interactive communication between the air-conditioning interactive terminal and the air conditioner are not limited to the above-mentioned embodiments; for example, the second registered user can issue information (such as issuing information that the air conditioner is currently in a maintenance state) in Moments through WeChat, so that many first registered users can conveniently learn the information. Alternatively, the second registered user can actively push information to the first registered user through an individual communication interface of WeChat, so that the specific first registered user can conveniently learn the information. Therefore, the air conditioner can realize the interactive communication with the user by way of social media. As one embodiment, when the case where the current operation temperature/operation humidity exceeds a set comfortable temperature interval/set comfortable humidity interval takes place in an air conditioning region corresponding to a certain air-conditioning end, the second registered user can actively issue prompt information to the first registered user, so that the first registered user can instantly make further judgement and remote control.

Figure 4:
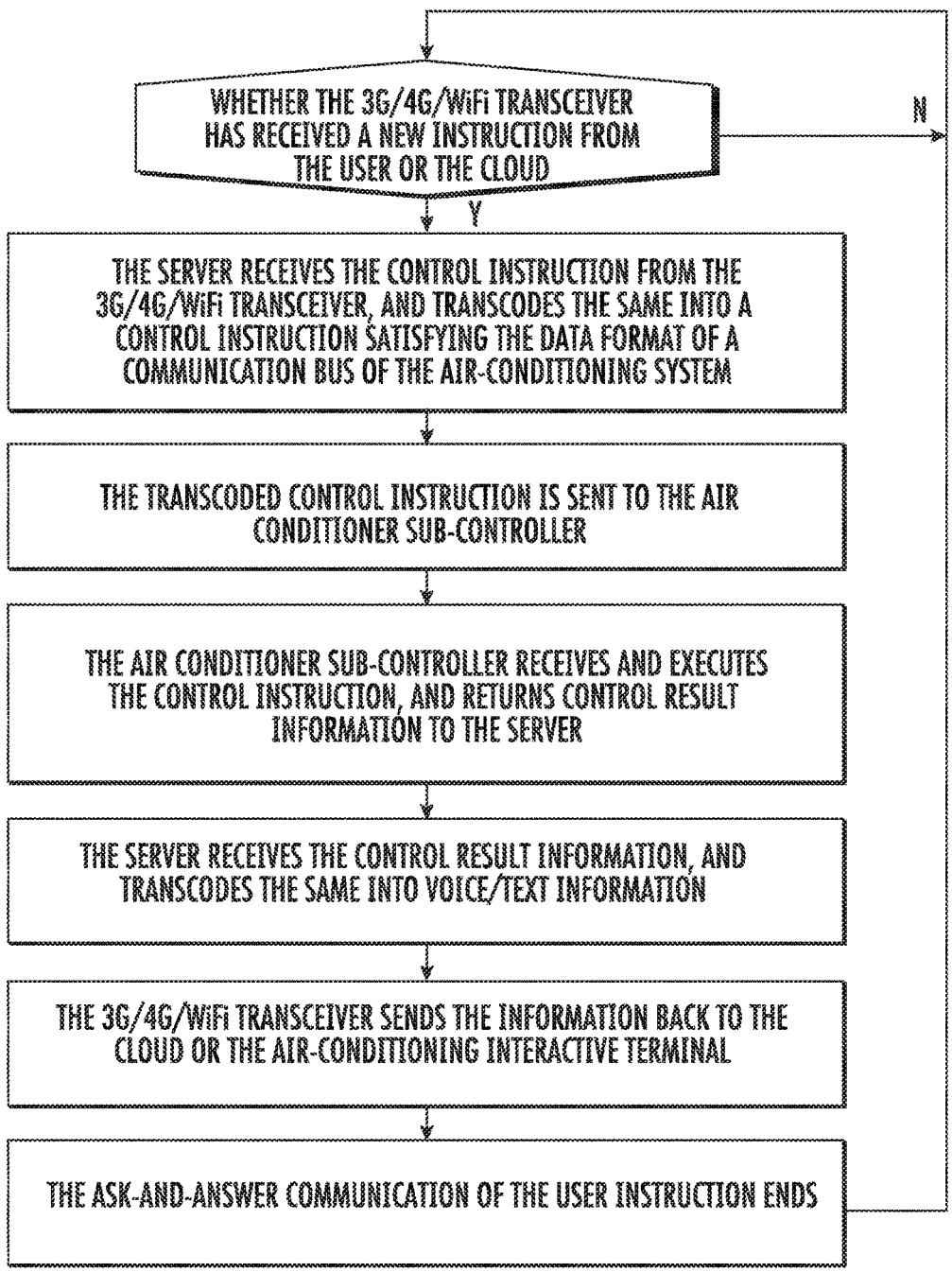
FIG. 4 is a schematic diagram of an interactive communication process between an air-conditioning interactive terminal and an air-conditioning system of one embodiment of the present invention.

FIG. 4 shows a schematic diagram of an interactive communication process between an air-conditioning interactive terminal and an air conditioner of one embodiment of the present invention. Detailed description is made below in conjunction with FIG. 1 and FIG. 4, where an interactive communication process between the corresponding server 30 end and the air conditioner sub-controller 41, 42, 43 and 44 is primarily shown, and explanation is made by taking an ask-and-answer communication process of one user instruction as an example.

Firstly, step S11, whether the 3G/4G/Wifi transceiver 31 has received a new instruction from the user or the cloud 70 is judged. The instruction of the user herein can refer to an instruction or information in various WeChat language formats sent from the air-conditioning interactive terminal 10 by the first registered user corresponding to the user 91 or the management/maintenance personnel 92; and the instruction of the cloud 70 can be an instruction or information in various WeChat language formats sent from the air-conditioning interactive terminal 10 by the first registered user corresponding to the cloud 70.

Further, step S12, the server 30 receives the control instruction of the user on the 3G/4G/Wifi transceiver 31, and transcodes the same into a control instruction satisfying the data format of the air conditioner bus.

Further, step S13, the server 30 sends the transcoded control instruction to each air conditioner sub-controller 41, 42, 43 and 44 through the air conditioner bus.

Further, step S14, the air conditioner sub-controller 41, 42, 43 and 44 coupled to the air conditioner bus receives and executes the control instruction, and returns control result information to the server 30.

Further, step S15, the server receives the control result information, and transcodes the same into the WeChat language.

Further, step S16, the 3G/4G/Wifi transceiver 31 instantly sends the WeChat language to the air-conditioning interactive terminal 10, namely to the first registered user; alternatively, it can also send the same to the cloud 70, to save the same in the cloud server/database 71.

At this point, step S17, the ask-and-answer communication of the user instruction ends.

Step S11 to step S17 stated above can be conducted circularly again and again.

Figure 5:
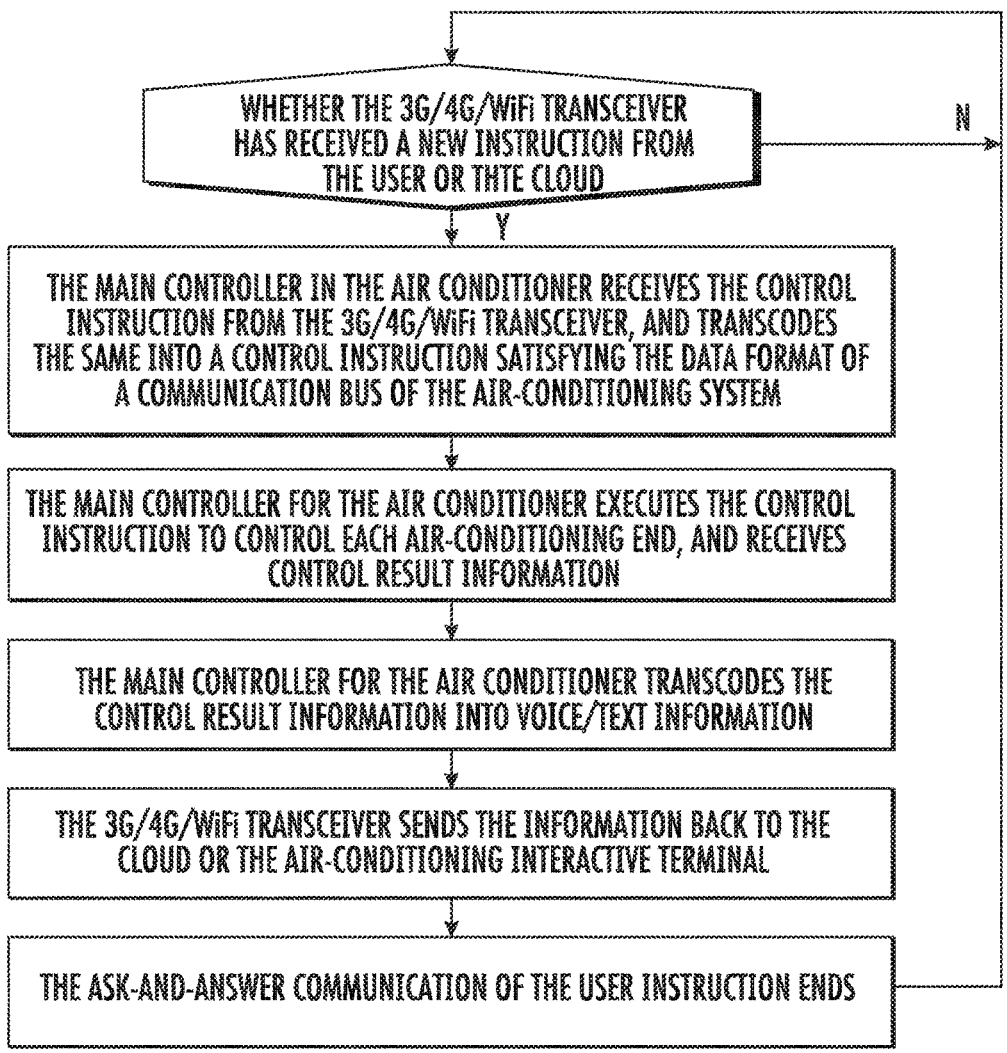
FIG. 5 is a schematic diagram of an interactive communication process between an air-conditioning interactive terminal and an air-conditioning system of a further embodiment of the present invention.

FIG. 5 shows a schematic diagram of an interactive communication process between an air-conditioning interactive terminal and an air conditioner of a further embodiment of the present invention. Detailed description is made below in conjunction with FIG. 2, FIG. 3 and FIG. 4, where an interactive communication process of the corresponding main controller 40 with the air conditioner control end 10 and the air conditioner is primarily shown, and explanation is made by taking an ask-and-answer communication process of one user instruction as an example.

Firstly, step S21, whether the 3G/4G/Wifi transceiver 31 has received a new instruction from the user or the cloud 70 is judged.

Further, step S22, the main controller 40 for the air conditioner directly receives the control instruction of the user on the 3G/4G/Wifi transceiver 31, and transcodes the same into a control instruction satisfying the data format of the air conditioner bus.

Further, step S23, the main controller for the air conditioner executes the control instruction to control each air-conditioning end, and receives control result information.

Further, step S24, the main controller for the air conditioner transcodes the control result information into the WeChat language.

Further, step S25, the 3G/4G/Wifi transceiver 31 instantly sends the WeChat language to the air-conditioning interactive terminal 10, namely to the first registered user; alternatively, it can also send the same to the cloud 70, to save the same in the cloud server/database 71.

At this point, step S26, the ask-and-answer communication of the user instruction ends.

Step S21 to step S26 stated above can be conducted circularly again and again.

The air-conditioning interactive terminal and the air-conditioning interactive system according to the embodiments of the present invention can be implemented based on an instant on-line chatting tool which has been applied on a large scale. Accordingly, not only the work of specifically developing a corresponding APP or software is omitted and the development cost is low, but also this mode of interactive communication with an air conditioner is more easily acceptable for a user. Moreover, the interactive communication process can be implemented by way of instant on-line chatting, and the interactive communication process with the air conditioner is very easy, simple, effective, convenient and rapid, and can be implemented remotely. Therefore, the user experience is greatly improved.

It will be understood that, when a component is referred to be "connected" or "coupled" to another component, it can be directly connected or coupled to the another component, or there can be an intermediate component. On the contrary, when a component is referred to be "directly coupled" or "directly connected" to another component, there is no intermediate component.

The above-mentioned examples mainly describe an air-conditioning interactive terminal and an air-conditioning interactive system of the present invention. Although only some of the embodiments of the present invention are described, a person of ordinary skill in the art should understand that the present invention can be implemented in many other forms without deviating from the concept and scope thereof. Therefore, the illustrated examples and implementations are considered illustrative but not restrictive, and the invention can cover various modifications and replacements without departing from the spirit and scope of invention defined by the appended claims.

What is claimed is:

1. An air-conditioning terminal comprising a processor and memory, wherein the processor and memory are configured to:

facilitation communication, via a social communication media module, wherein a user is registered as a first registered user in the social communication media module, wherein the air-conditioning interactive terminal is configured such that the user realizes interactive communication between the first registered user and a second registered user corresponding to one or more air conditioners based on the social communication media module, wherein the second registered user is correspondingly registered by the air conditioners in the social communication media module;

wherein the interactive communication between the first registered user and the second registered user is provided directly from the first registered user to the second registered via the social communication media module;

wherein the air-conditioning interactive terminal is configured such that the first registered user requests to interactively communicate with the second registered user based on the social communication media module;

wherein content interactively communicable between the first registered user and the second registered user is defined by the type of interactive communication between the first registered user and the second registered user;

wherein when the first registered user is in a type of ordinary interactive communication with the second registered user, the content interactively communicable between the first registered user and the second registered user comprises:
device nameplate information and/or operation state information of a queried air conditioner and first query result information returned correspondingly; and/or
an air-conditioning end control instruction and air-conditioning end control result information returned correspondingly;
wherein when the first registered user is in a type of special interactive communication with the second registered user, the content interactively communicable between the first registered user and the second registered user comprises:
a maintenance schedule for a queried air conditioner and second query result information returned correspondingly; and/or
an air-conditioning host control instruction and air-conditioning host control result information returned correspondingly; and/or
an air-conditioning end control instruction and air-conditioning end control result information returned correspondingly; and/or
maintenance state information of the air-conditioner.

2. The air-conditioning interactive terminal according to claim 1, wherein the first query result information comprises: the device nameplate information of the air conditioner and/or a current operation temperature/operation humidity and/or set temperature/set humidity and/or operation mode of the air conditioner and/or an operation state of an air conditioner component and/or energy consumption of the air conditioner.

3. The air-conditioning interactive terminal according to claim 2, wherein by acquiring the current operation temperature/operation humidity of the air conditioner through the communication between the social communication media module and a temperature sensor/humidity sensor.

4. The air-conditioning interactive terminal according to claim 1, wherein the air-conditioning end control instruction comprises modifying the set temperature/set humidity and/or the operation mode, and the corresponding air-conditioning end control result information comprises whether the control instruction is executed for an estimated control instruction duration.

5. The air-conditioning interactive terminal according to claim 1, wherein the content interactively communicated between the first registered user and the second registered user comprises text information and/or multi-media information.

6. The air-conditioning interactive terminal according to claim 1, wherein the first registered user of the air-conditioning interactive terminal learns, through the social communication media module, information issued by the second registered user through the social communication media module.

7. The air-conditioning interactive terminal according to claim 6, wherein the information issued through the social communication media module comprises that the current operation temperature/operation humidity exceeds a set comfortable temperature interval/set comfortable humidity interval.

8. The air-conditioning interactive terminal according to claim 1, wherein the second registered user of the air conditioner is correspondingly registered in the social communication media module by an air conditioner group composed of a plurality of air conditioners.

9. The air-conditioning interactive terminal according to claim 1, wherein the first registered user interactively communicates with the second registered user through a cloud, and the content interactively communicated between the first registered user and the second registered user is stored in a cloud server of the cloud.

10. The air-conditioning interactive terminal according to claim 9, wherein the first registered user can upload to the cloud server a personalized temperature/humidity comfort interval set thereby; and/or the cloud server learns by itself by means of a set temperature/humidity value input by the first registered user historically, to acquire the personalized temperature/humidity comfort interval of the user; and the air conditioner receives information of the cloud server, so as to set the position where the first registered user is located into the personalized temperature/humidity comfort interval of the user.

11. A controller for an air-conditioning system, the controller being coupled to a bus of the air-conditioning system comprising an air-conditioning end and an air-conditioning host and configured with a social communication media module, wherein the controller is registered as a second registered user in the social communication media module, and the second registered user can realize interactive communication with a first registered user of the social communication media module registered by a user through an interactive terminal;
wherein the interactive communication between the first registered user and the second registered user is provided directly from the first registered user to the second registered via the social communication media module;
wherein the controller is configured such that the first registered user requests to interactively communicate with the second registered user based on the social communication media module;
wherein content interactively communicable between the first registered user and the second registered user is defined by the type of interactive communication between the first registered user and the second registered user;
wherein when the first registered user is in a type of ordinary interactive communication with the second registered user, the content interactively communicable between the first registered user and the second registered user comprises:
device nameplate information and/or operation state information of a queried air conditioner and first query result information returned correspondingly; and/or
an air-conditioning end control instruction and air-conditioning end control result information returned correspondingly;
wherein when the first registered user is in a type of special interactive communication with the second registered user, the content interactively communicable between the first registered user and the second registered user comprises:
a maintenance schedule for a queried air conditioner and second query result information returned correspondingly; and/or
an air-conditioning host control instruction and air-conditioning host control result information returned correspondingly; and/or an air-conditioning end control instruction and air-conditioning end control result information returned correspondingly; and/or maintenance state information of the air-conditioner.

12. The controller for an air-conditioning system according to claim 11, wherein the controller is provided with a mobile wireless transceiver, and the controller for an air-conditioning system is in communicative connection with the interactive terminal of the user through a mobile wireless network.

13. The controller for an air-conditioning system according to claim 12, wherein the controller further comprises an air-conditioning end controller, and the air-conditioning end is coupled to a temperature sensor/humidity sensor disposed in the air-conditioning end, and is capable of sending temperature/humidity information collected by the temperature sensor/humidity sensor at a corresponding moment to the controller.

* * * * *